United States Patent
Myojo

(10) Patent No.: US 7,051,966 B2
(45) Date of Patent: May 30, 2006

(54) REEL UNIT AND COVER MEMBER FOR A SPINNING REEL

(75) Inventor: Seiji Myojo, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/863,243

(22) Filed: Jun. 9, 2004

(65) Prior Publication Data

US 2004/0251362 A1    Dec. 16, 2004

(30) Foreign Application Priority Data

Jun. 13, 2003   (JP)   .............................. 2003-168745

(51) Int. Cl.
*A01K 89/01*    (2006.01)

(52) U.S. Cl. ...................... 242/311; 242/312

(58) Field of Classification Search ................ 242/310, 242/311, 312, 315

See application file for complete search history.

(56) References Cited

U.S. PATENT DOCUMENTS

| | | |
|---|---|---|
| 2,863,617 A | 12/1958 | Chapin et al. |
| 4,402,469 A | 9/1983 | Stiner et al. |
| 4,524,923 A | 6/1985 | Tunoda et al. |
| 5,350,130 A * | 9/1994 | Hitomi et al. ............... 242/241 |
| 5,476,230 A * | 12/1995 | Yamaguchi .................. 242/311 |
| 6,857,588 B1 * | 2/2005 | Chang ......................... 242/311 |

FOREIGN PATENT DOCUMENTS

| | | |
|---|---|---|
| FR | 2740003 A | 4/1997 |
| JP | 09-313079 A | 12/1997 |
| JP | 9-313079 A | 12/1997 |
| JP | 2004-81151 A | 3/2004 |

* cited by examiner

*Primary Examiner*—Emmanuel M Marcelo
(74) *Attorney, Agent, or Firm*—Shinjyu Global IP Counselors

(57) ABSTRACT

A reel body of a spinning reel includes a first opening formed in a rear end portion of the reel body, and a mounting portion formed on the periphery of the first opening. A first cover member and a second cover member can be selectively mounted on the mounting portion of the reel body such that the contour of either of the cover members is continuous with the contour of the reel body. The first cover member is mounted so as to close the first opening. The rear second cover member has a mounting portion and a rear drag mounting portion that is formed unitarily with the mounting portion. The rear drag mechanism can be mounted within the rear drag accommodating portion. With this invention, it is possible to form a reel unit of a spinning reel with an inexpensive structure without increasing the size of the reel unit.

18 Claims, 6 Drawing Sheets

REEL UNIT AND COVER MEMBER FOR A SPINNING REEL

BACKGROUND OF THE INVENTION

1. Field of the Invention

The present invention relates to a reel unit. More specifically, the present invention relates to a reel unit of a spinning reel and a cover member for the reel unit.

2. Background Information

A spinning reel generally includes a reel unit mounted on a fishing rod, a handle rotatively attached to a reel unit, a rotor rotatively mounted to the reel unit, and a spool mounted to the reel unit forward of the rotor so as to be able to shift back and forth. Fishing line is guided by the rotor and is wound around the outer periphery of the spool.

The reel unit is furnished with a T-shaped rod-attachment leg mounted on a fishing rod, and a reel body that is formed unitarily with the rod-attachment leg with a variety of mechanisms being accommodated in the interior of the reel body. The reel body includes a main unit and a lid member. The main unit has an accommodating space in the interior thereof that opens to the side. The lid member is detachably mounted on the main unit so as to cover the opening of the main unit.

A drag mechanism is provided in this type of a spinning reel in order to apply braking force to the rotation of the spool. A front drag mechanism that is disposed on the front of a spool shaft, and a rear drag mechanism that is disposed on the rear of the spool shaft, are known drag mechanisms for spinning reels. The front drag mechanism is mounted in the interior of the spool, and the rear drag mechanism is mounted on the rear of the reel unit.

With a spinning reel on which this kind of rear drag mechanism is mounted, the reel unit is unitarily formed in a cylindrical shape so as to project rearward, in order to match the contour of a cylindrical drag knob that serves to operate the rear drag mechanism (see, for example, Japanese Patent Application Publication No. 9-313079). By forming a cylindrical rear drag accommodating portion on the rear of the reel unit, a variety of mechanisms of the rear drag mechanism can be accommodated in the interior, and can match the shape of the drag knob.

In the aforementioned conventional spinning reel provided with the rear drag mechanism, the rear drag accommodating portion is formed in a cylindrical shape that projects outward on the rear of the reel unit. Thus, because the shape of the reel body as a whole will become complicated, a special die needs to be employed so that a main portion of the reel body and the cylindrical rear drag accommodating portion will be unitarily formed. This makes the task of forming the reel body time consuming, and may increase manufacturing costs.

In view of this, some have considered forming the main portion of the reel body, the cylindrical rear drag accommodating portion, and a cover portion separately. Here, after forming the main portion of the reel body and the cylindrical rear drag accommodating portion separately, an engagement portion is formed on the rear of the main portion, and then the cylindrical rear drag accommodating portion is engaged with and fixedly attached to the engagement portion. By forming the main portion of the reel body and the rear drag accommodating portion separately like this, the reel body can be easily formed without having to employ a special die.

In addition, with this type of spinning reel, some have considered forming on the rear portion of the reel unit a mounting portion that is partially recessed, and providing an attachable cover member that is smoothly continuous with the reel body, in order to further improve the design of the spinning reel. This type of cover member includes a circular opening in the rear portion thereof, and a separate cylindrical rear drag accommodating portion mounted on the rear end of the reel body from the opening of the cover member.

In this type of spinning reel on which a cover member is mounted, a plurality of engagement portions for engaging the cover member and the cylindrical rear drag accommodating portion are formed on the reel body. Thus, because the reel body of this spinning reel includes a plurality of engagement portions, the reel body may become enlarged.

In view of the above, it will be apparent to those skilled in the art from this disclosure that there exists a need for an improved reel unit of a spinning reel that overcome the above mentioned problems of the prior art. This invention addresses this need in the art as well as other needs, which will become apparent to those skilled in the art from this disclosure.

SUMMARY OF THE INVENTION

An object of the present invention is to form a reel unit of a spinning reel with an inexpensive structure without enlarging the reel unit.

A reel unit for a spinning reel according to the first aspect of the present invention is adapted to be mounted to a fishing rod, provided with a rear drag mechanism, and capable of reeling out fishing line in the forward direction. The reel unit includes a rod attachment leg portion, a reel body and a cover member. The rod attachment leg portion is mounted on the fishing rod. The reel body is continuously formed with the rod attachment leg portion, and includes a first opening that is formed on its rear end and a mounting portion formed on the periphery of the first opening. The cover member is mounted on the mounting portion such that a contour of the cover member is smoothly continuous with a contour of the reel body. The cover member includes a main body portion and a rear drag accommodating portion. The interior space of the rear drag accommodation portion communicates with the first opening. The rear drag mechanism is adapted to be mounted in the rear drag accommodation portion. The rear drag accommodating portion is unitarily formed with the main body portion.

With this reel unit, the cover member includes the rear drag accommodating portion in which the rear drag mechanism is to be arranged. Here, the reel body can be easily formed without employing a special die because the rear drag accommodating portion and the reel body are formed separately. In addition, because the rear drag mechanism is arranged in the rear drag accommodating portion, the rear drag mechanism will no longer need to be mounted on the rear portion of the reel body as in the prior art, and thus an engagement portion for engaging the rear drag mechanism with the real body will also no longer need to be provided. Thus, the overall size of the reel unit will not increase and the reel unit can be formed with an inexpensive structure.

The reel unit according to the second aspect of the present invention is the reel unit disclosed in the first aspect of the present invention, in which the cover member further includes a second opening formed on the rear end portion of the rear drag accommodating portion. With this configuration, the rear drag mechanism can be mounted from the second opening at least partially.

The reel unit according to the third aspect of the present invention is the reel unit disclosed in the first or the second aspect of the present invention, in which the cover member is elastically engaged with the reel body by press-fitting. With this configuration, the cover member will be easily mounted.

The reel unit according to the fourth aspect of the present invention is the reel unit disclosed in the first or the second aspect of the present invention, in which the cover member is fixedly coupled to the reel body with a screw. With this configuration, the cover member will be easily and reliably attached and removed.

The reel unit according to the fifth aspect of the present invention is the reel unit disclosed in any of the first through fourth aspects of the present invention, in which the rear drag accommodating portion is formed in a cylindrical shape so as to project rearward from the main body portion. With this configuration, because the rear drag accommodating portion is formed in cylindrical shape so as to project rearward, the rear drag mechanism will be easily mounted and the configuration of the cover member will be simplified.

The reel unit according to the sixth aspect of the present invention is the reel unit of the fifth aspect of the present invention, in which the rear drag accommodating portion includes a male-threaded portion formed on its outer periphery, the male-threaded portion being adapted to engage with a female-threaded portion formed on an inner periphery of the rear drag mechanism. With this configuration, by screwing the female-threaded portion of the rear drag mechanism onto the male-threaded portion of the rear drag accommodating portion of the cover member, the rear drag mechanism will be easily and reliably attached and removed.

A spinning reel according to the seventh aspect of the present invention is mounted on a fishing rod, is provided with a handle, a reel unit as set forth in any of the first through sixth aspect of the present invention and rotatively supporting the handle, a rotor rotatively supported on a front of the reel unit, and a spool disposed on a front of the rotor so as to be movable forward and backward.

In this reel unit, the cover member is mounted on the mounting portion, and has a rear drag accommodating portion. When the spinning reel is provided with a rear drag mechanism, the rear drag mechanism is mounted on the rear drag accommodating portion of the cover member. Here, because the cover member includes the rear drag accommodating portion in which the rear drag mechanism is arranged, the overall size of the reel unit will not increase and the reel unit can be formed with an inexpensive structure.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
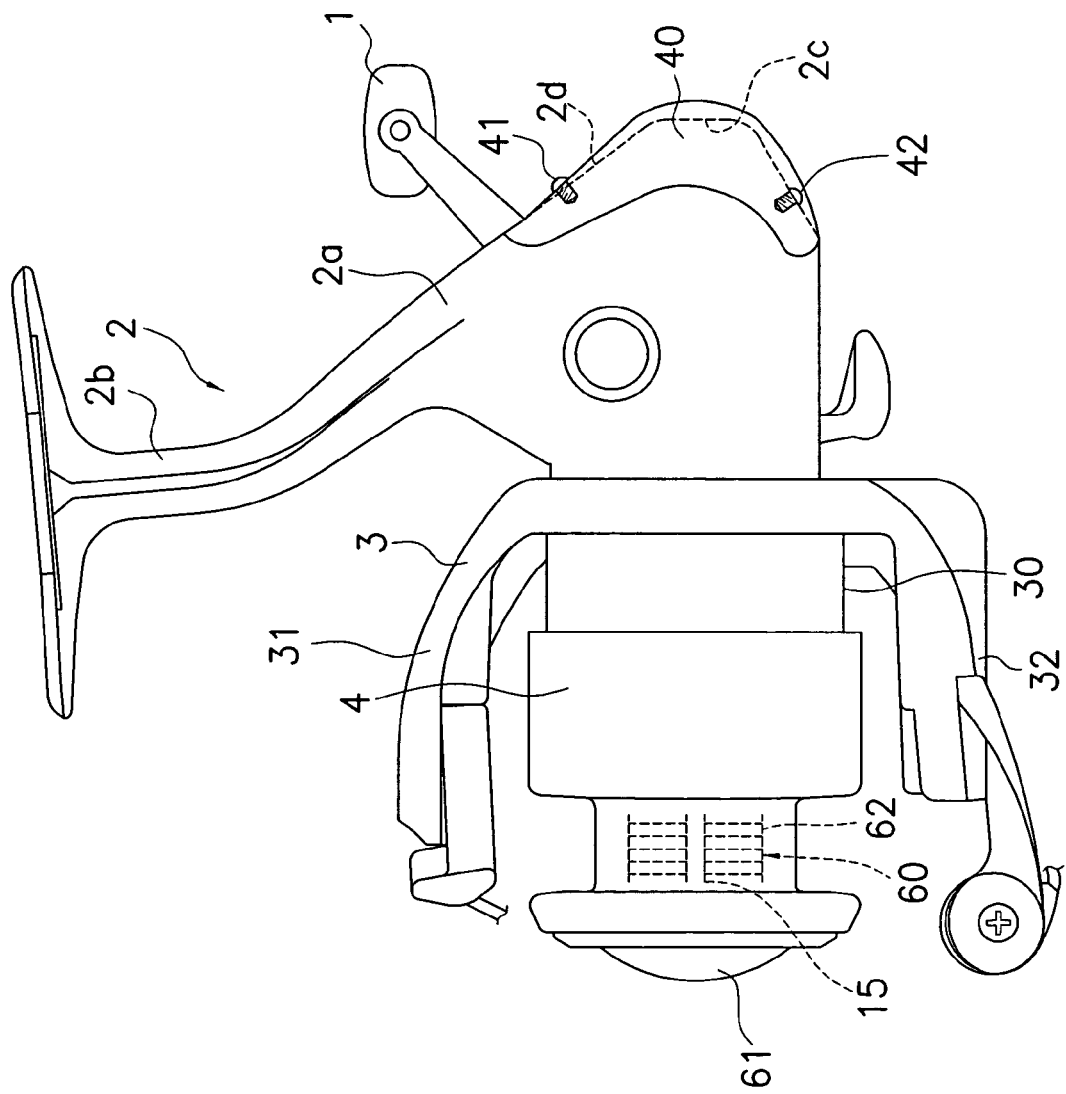
FIG. 1 is a lateral view of a spinning reel according to an embodiment of the present invention, in which a front drag mechanism is mounted.

Referring initially to FIG. 1, a spinning reel is illustrated in accordance with a first embodiment of the present invention.

Figure 2:
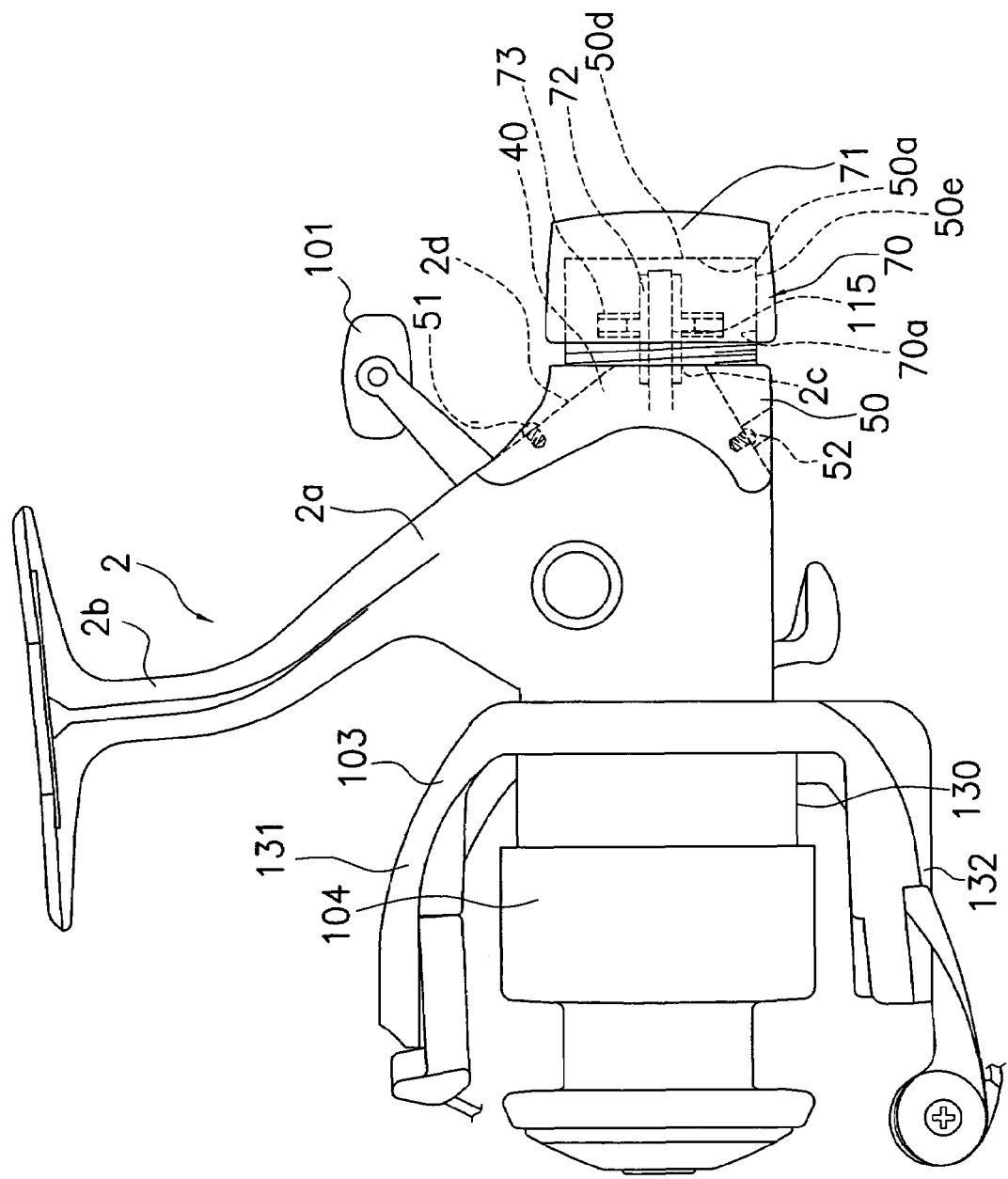
FIG. 2 is a lateral view of a spinning reel according to the embodiment of the present invention, in which a rear drag mechanism is mounted.

The spinning reel in which an embodiment of the present invention is adopted is a reel having a reel unit 2 which can be used in a front drag type spinning as shown in FIG. 1 and a rear drag type spinning reel as shown in FIG. 2. A later-described first cover member 40 (see FIG. 1) and a second cover member 50 (see FIG. 2) are respectively and selectively mounted on the reel unit 2.

As shown in FIG. 1, the front drag type spinning reel includes a reel unit 2 that rotatively supports a handle 1, a rotor 3 and a spool 4. The rotor 3 is rotatively supported on the front of the reel unit 2. The spool 4 has fishing line wound around the outer peripheral surface thereof, and is disposed on the front of the rotor 3 so that it can be moved forward and backward.

The reel unit 2 includes a reel body 2a, and a rod attachment leg 2b that extends diagonally upward and forward from the reel body 2a. The reel body 2a includes an interior space (not shown) that accommodates a variety of mechanisms therein.

As shown in FIG. 1, the rotor 3 includes a cylindrical portion 30, and first and second rotor arms 31 and 32 which are disposed opposite one another at the sides of the cylindrical portion 30.

The spool 4 is disposed between the first rotor arm 31 and the second rotor arm 32 of the rotor 3, and is mounted on a front end portion of the spool shaft 15 with a front drag mechanism 60 interposed between the spool shaft 15 and the spool 4.

As shown in FIG. 1, the front drag mechanism 60 is mounted between the spool 4 and the spool shaft 15a, and is a mechanism for applying drag force to the spool 4. The front drag mechanism 60 includes a knob 61 for manually adjusting the drag force, and a friction portion 62 made up of a plurality of disks that are pressed toward the spool 4 by the knob 61.

As shown in FIG. 1 and FIGS. 3(b) to 5(b), the reel body 2a includes a first opening 2c formed on the rear end portion thereof, and a mounting portion 2d formed in a tapered shape on the periphery of the first opening 2c toward the first opening 2c. The first cover member 40 is smoothly continuous with the mounting portion 2d of the reel body 2a, and is mounted on the mounting portion 2d.

As shown in FIG. 3(a) to FIG. 5(a), the mounting portion 2d is formed as a stepped portion whose surface is lower then that of the reel body 2a, and the first cover member 40 is mounted on the stepped portion. When the first cover member 40 is mounted on the stepped portion, the outer contour of the first cover member 40 will become flush and continuous with that of the reel body 2a. As shown in FIG. 3(b) and FIG. 4(b), a hole portion 2e that serves to fixedly couple the first cover member 40 with a screw member 41 (see FIG. 1) is formed in the upper part of the mounting portion 2d. As shown in FIG. 3(b) to FIG. 5(b), a hole portion 2f that serves to fixedly couple the first cover member 40 with a screw member 42 (see FIG. 1) is formed in the lower part of the mounting portion 2d.

As shown in FIG. 1 and FIG. 3(a) to FIG. 5(a), the first cover member 40 is mounted so as to close the first opening 2c, and the tip of a rear end portion of the first cover member 40 has a slightly rounded shape. The contour of the first cover 40 is formed in a tapered shape in accordance with that of the reel body 2a, and when the first cover member 40 is mounted on the mounting portion 2d, there is a smooth continuity from the reel body 2a toward the first cover member 40. In addition, as shown in FIG. 3(a) to FIG. 5(a), through holes 40a, 40b into which screw members 41, 42 are mounted are formed on the upper and the lower portions of a main body portion 40c of the first cover member 40.

In order to assemble this front drag type spinning reel, a variety of mechanisms such as the front drag mechanism 60 and the like are assembled first. Then, the first cover member 40 is fixedly coupled to the reel body 2a by mounting the first cover member 40 on the mounting portion 2d and installing the screw members 41, 42 in the hole portions 2e, 2f through the through holes 40a, 40b. Here, the first opening 2c can be closed while maintaining the contour of the rear end portion of the first cover member 40 in a tapered shape.

On the other hand, as shown in FIG. 2, a rear drag type spinning reel includes a reel unit 2 that rotatively supports a handle 101, a rotor 103 and a spool 104. The rotor 103 is rotatively supported on the front of the reel unit 2. The spool 104 has fishing line wound around the outer peripheral surface thereof, and is disposed on the front of the rotor 103 so that it can be moved forward and backward.

The reel unit 2 includes a reel body 2a, and a rod attachment leg 2b that extends diagonally upward and forward from the reel body 2a. The reel body 2a includes an interior space (not shown) for accommodating a variety of mechanisms therein.

The rotor 103 includes a cylindrical portion 130, and first and second rotor arms 131, 132 that face each other and are provided on the sides of the cylindrical portion 130.

The spool 104 is disposed between the first rotor arm 131 and the second rotor arm 132 of the rotor 103.

As shown in FIG. 2 and FIGS. 3(b) to 5(b), the reel body 2a includes a first opening 2c formed on the rear end portion thereof and a mounting portion 2d formed on the periphery of the first opening 2c so as to taper toward the first opening 2c. The second cover member 50 is smoothly continuous with the reel body 2a and is mounted on the mounting portion 2d. A rear drag mechanism 70 is mounted on a rear end portion of the second cover member 50.

As shown in FIG. 2, the rear drag mechanism 70 is connected non-rotatively and movably in the axial direction to the rear end portion of the spool shaft 115, and serves to brake the rotation of the spool 104 in the line reel-out direction via the spool shaft 115. The rear drag mechanism 70 includes a female-threaded portion 70a formed on the inner periphery thereof, and a tubular knob portion 71 for manually adjusting the drag force. The rear drag mechanism 70 primarily includes a cylindrical bush 72 that is non-rotatively and slidably mounted on the spool 115, and a friction portion 73 that is pressed by the flange portion of the bush 72 and made up of a plurality of friction plates. Here, when the knob portion 71 is rotated, the friction portion 73 is pressed by the bush 72 to thereby allow the drag force to be adjusted.

Figure 3:
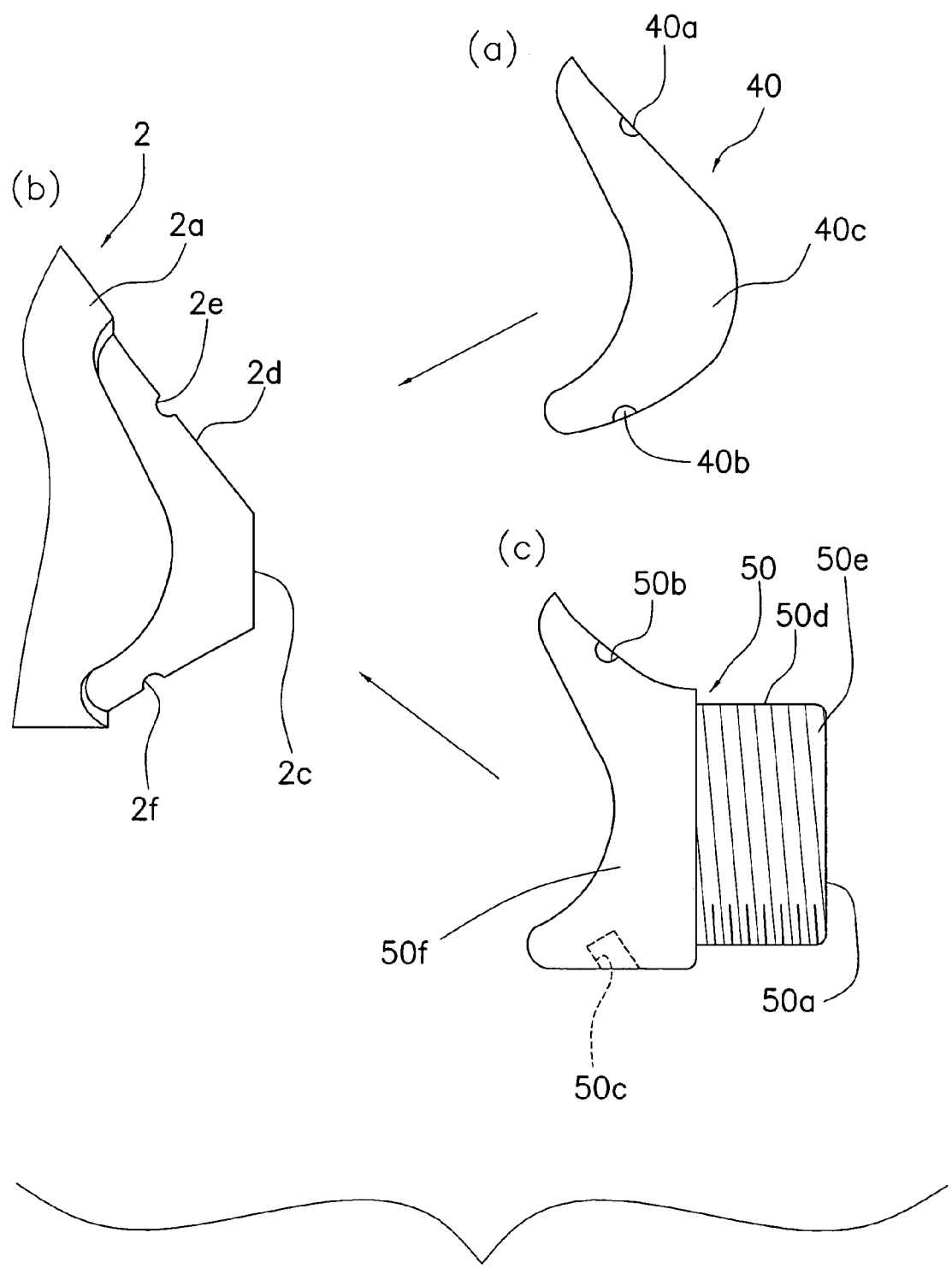
FIG. 3 is an enlarged exploded lateral view of a rear end portion of the spinning reel according to the embodiment of the present invention.
Figure 4:
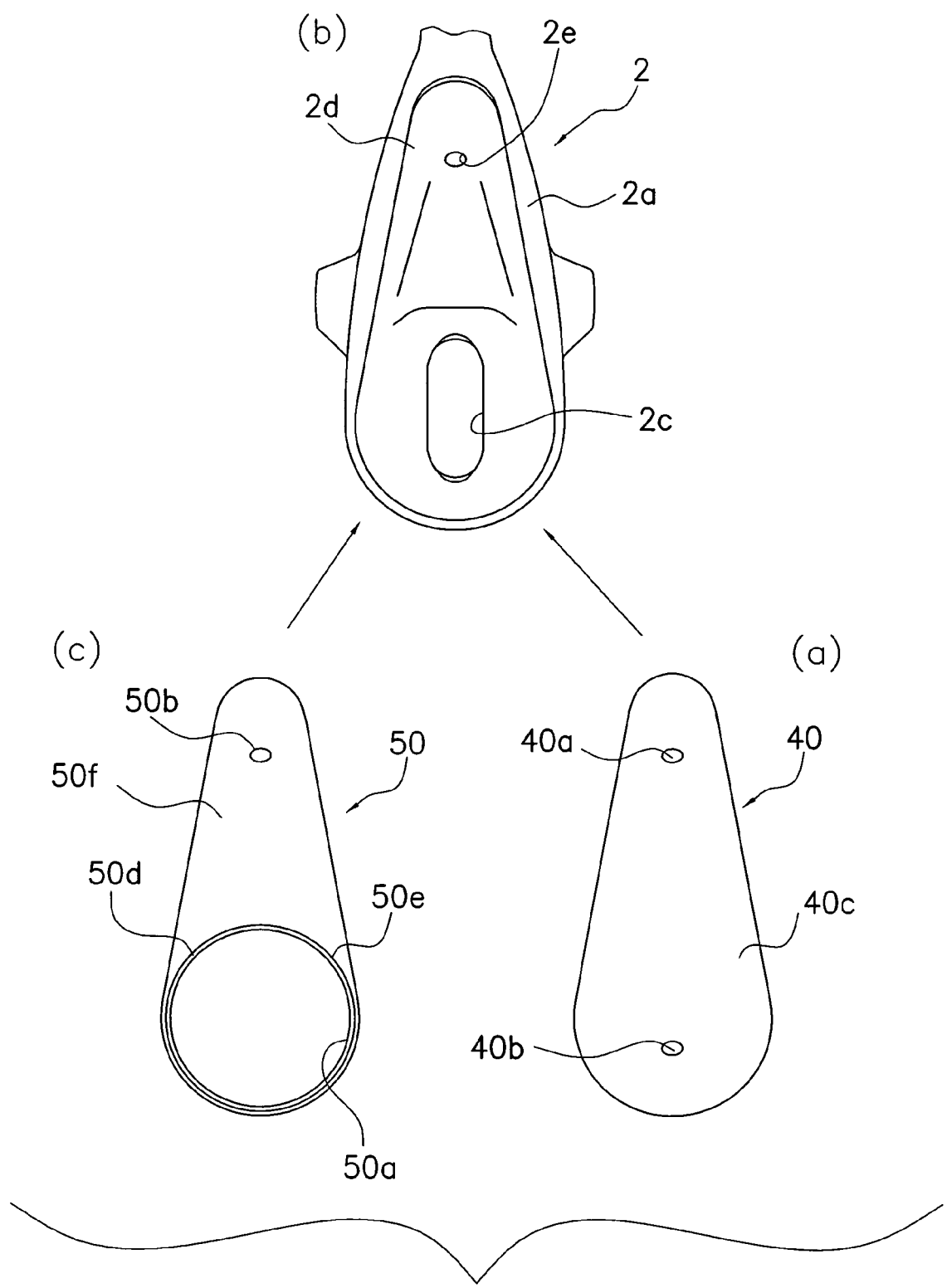
FIG. 4 is an enlarged exploded rear view of the rear end portion of the spinning reel according to the embodiment of the present invention.
Figure 5:
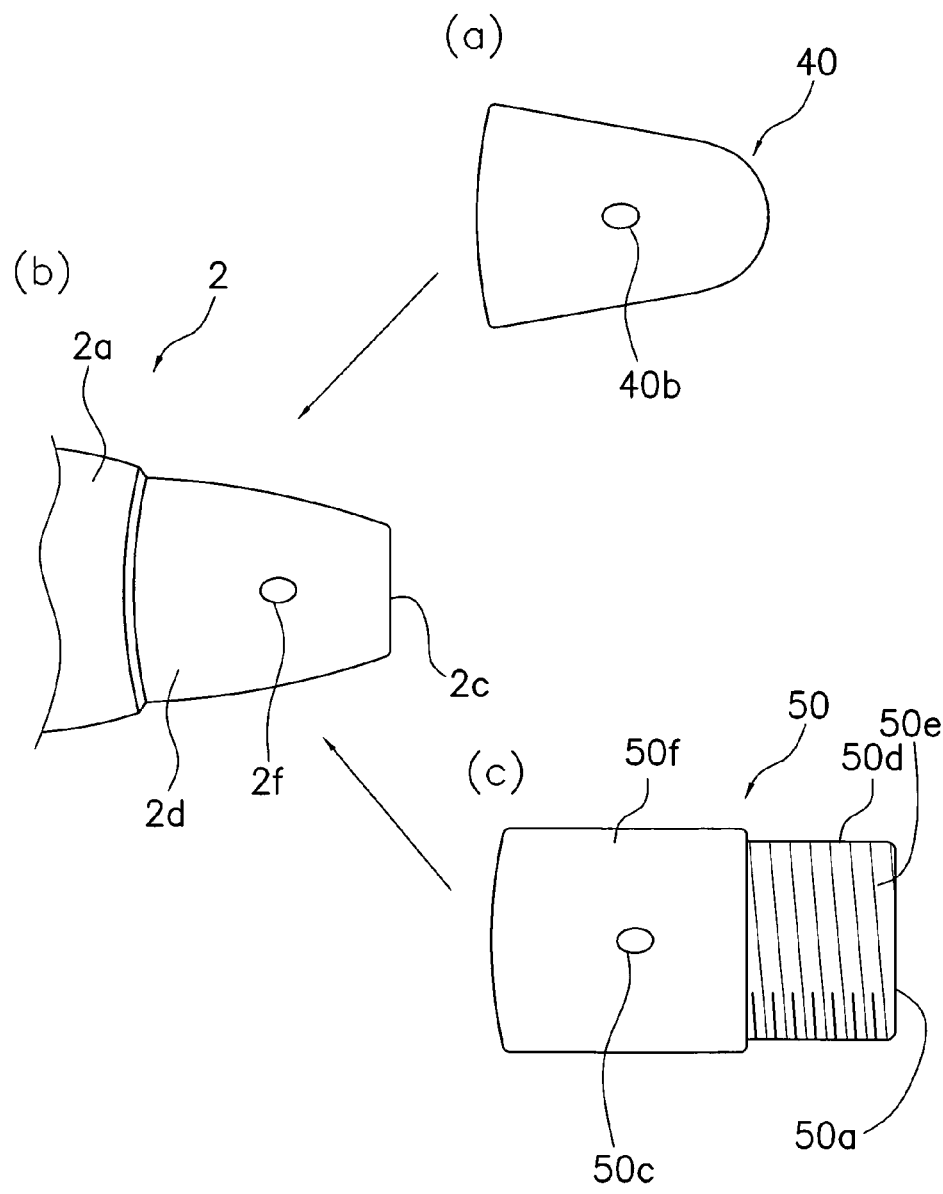
FIG. 5 is an enlarged exploded bottom view of a rear end portion of the spinning reel according to the embodiment of the present invention.

As shown in FIG. 3(b) to FIG. 5(b), the mounting portion 2d is formed as a stepped portion whose surface is lower than that of the reel body 2a, and the second cover member 50 is mounted on the stepped portion. When the second cover member 50 is mounted on the stepped portion, the outside contour of the second cover member 50 will become flush and smoothly continuous with that of the reel body 2a. As shown in FIG. 3 and FIG. 4, a hole portion 2e that serves to fixedly couple the second cover member 50 with a screw member 51 (see FIG. 2) is formed in the upper part of the mounting portion 2d. As shown in FIG. 3(b) to FIG. 5(b), a hole portion 2f that serves to fix the second cover member 50 with a screw member 52 (see FIG. 2) is formed in the lower part of the mounting portion 2d.

As shown in FIG. 2 and FIG. 3(c) to FIG. 5(c), the second cover member 50 includes a main body portion 50f, a second opening 50a that communicates with the first opening 2c and is formed on the rear end portion of the main portion 50f, and a rear drag accommodating portion 50d in the interior of which the rear drag mechanism 70 is mounted from the second opening 50a.

As shown in FIG. 4, the shape of the second opening 50a as viewed from the rear is circular, and is approximately the same shape as the shape of the knob portion 71 of the rear drag mechanism 70. In addition, as shown in FIG. 3(c) to FIG. 5(c), through holes 50b, 50c into which screw members 51, 52 are mounted are formed in the upper and the lower portions of the main portion 50f of the second cover member 50. As shown in FIG. 2 and FIG. 3(c) to FIG. 5(c), the rear drag accommodating portion 50d is unitarily formed with the main body portion 50f in a cylindrical shape so as to project rearward. A male-threaded portion 50e that engages with the female-threaded portion 70a of the rear drag mechanism 70 is formed on the outer periphery of the rear drag accommodating portion 50d.

In order to assemble this rear drag type spinning reel, the second cover member 50 is mounted on the mounting portion 2d with the spool shaft 115 projecting outward from the first opening 2c, and the screw members 51, 52 are installed in the hole portions 2e, 2f via the through holes 50b, 50c to thereby fixedly couple the second cover member 50 to the reel body 2a. Then, with the spool shaft 115 projecting out from the second opening 50a of the second cover member 50, the rear drag mechanism 70 is mounted in the rear drag accommodating portion 50d of the second cover member 50 so as to close the second opening 50a. Here, the contour of the rear end portion of the second cover member 50 is cylindrical in shape and thus can match the contour of the knob 71 of the rear drag mechanism 70.

With this type of spinning reel, as shown in FIG. 1, the first cover member 40 is mounted on the mounting portion 2d with a taper shaped contour when the front drag mechanism 60 is provided. On the other hand, as shown in FIG. 2, when the rear drag mechanism 70 is provided, the second cover member 50 is mounted on the mounting portion 2d and the rear drag mechanism 70 is mounted on the rear drag accommodating portion 50d of the second cover member 50. Here, because the rear drag mechanism 70 is mounted in the rear drag accommodating portion 50d of the second cover member 50 that is formed separately from the reel unit 2, it will no longer be necessary to mount the rear drag mechanism 70 on the rear end portion of the reel unit 2 as in the prior art. Thus, because it will no longer be necessary to provide an engagement portion on the rear portion of the reel unit 2 that serves to engage with the rear drag mechanism 70, the size of the reel unit 2 will not increase, and the reel unit 2 can be formed with an inexpensive structure.

Figure 6:
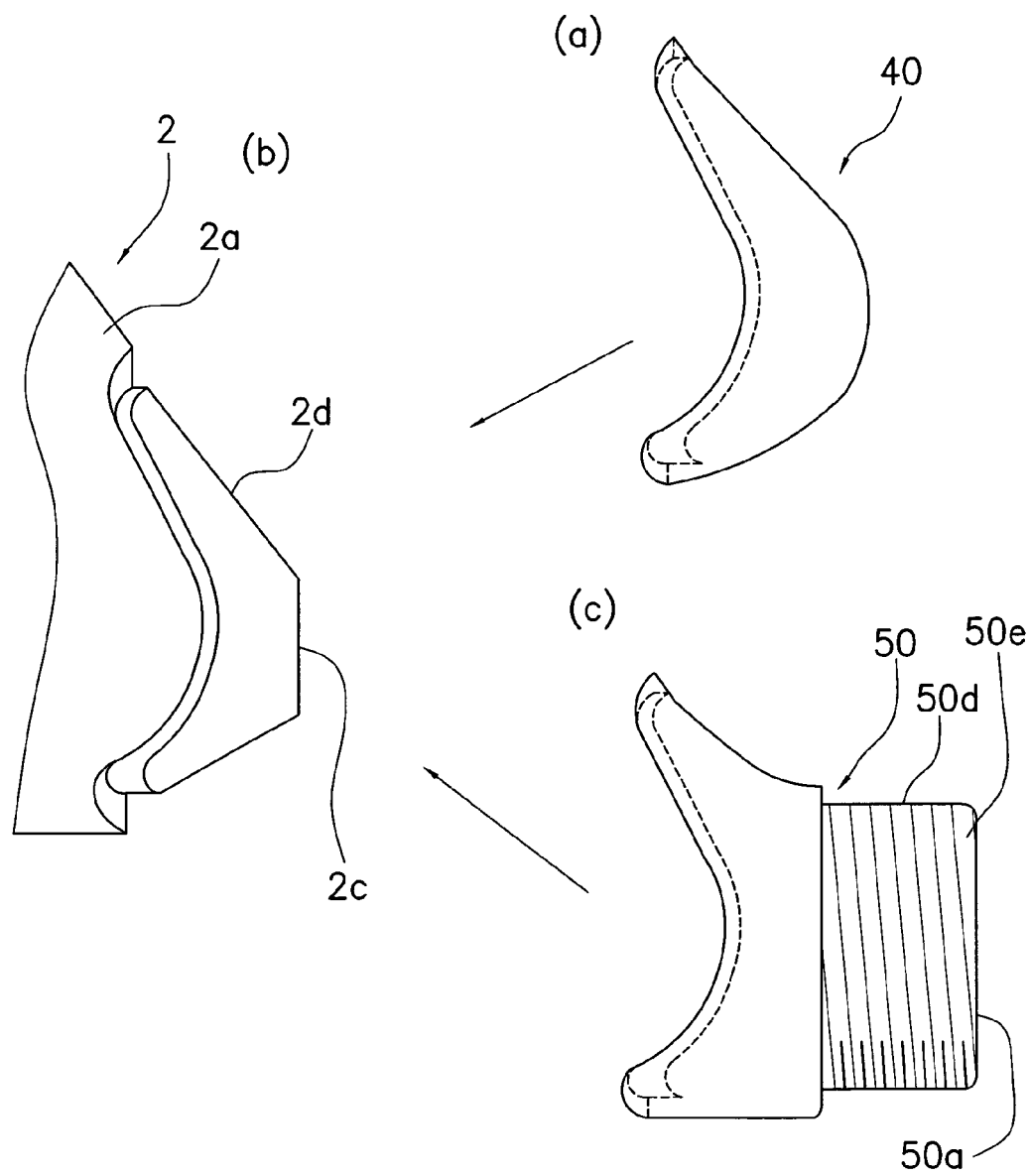
FIG. 6 is an enlarged exploded lateral view of a rear end portion of the spinning reel according to an alternate embodiment of the present invention.

Other Embodiments (a) In the above-described embodiment, the first cover member 40 and the second cover member 50 are fastened to the reel body 2a with the screw members 41, 42 and the screw members 51, 52, but the way in which the first cover member 40 and the second cover member 50 are fastened to the reel body 2a is not limited thereto. For example, as seen in FIG. 6, the first cover member 40 and the second cover member 50 can be elastically engaged with the reel body 2a by press-fitting.

(b) In the above-described embodiment, the contour of the first cover member 40 is formed in a tapered shape along the reel body 2a, but the contour of the first cover member 40 is not limited to such shape. In addition, the mounting portion 2d can be formed into any shape so long as it is formed in a tapered shape toward the rear end thereof. The first cover member 40 and the second cover member 50 can also be shaped into any shape that matches the shape of the mounting portion 2d.

(c) In the above-described embodiment, the male-threaded portion 50e that engages with the female-threaded portion 70a of the rear drag mechanism 70 is formed on the outer periphery of the rear drag accommodating portion 50d. However, the method of mounting the rear drag mechanism 70 is not limited thereto. The rear drag mechanism 70 may be attached to the rear drag accommodating portion by any other conventional method of attachment.

(d) In the above-described embodiment, the first cover member 40 is mounted when the front drag mechanism 60 is provided, and the second cover member 50 is mounted when the rear drag mechanism 70 is provided. But it is also possible to mount the second cover member 50 without making the reel unit 2 interchangeable between the front-drag type and the rear-drag type. In other words, it is possible to mount the second cover member 50 regardless of whether the front drag mechanism 60 is mounted.

(e) In the above-described embodiment, the first cover member 40 and the second cover member 50 cover the entire reel body 2a. However, when the reel body 2a includes a main unit having a side opening for mounting various mechanisms in the interior thereof and a lid member for closing the opening of the main unit, the first cover member 40 and the second cover member 50 can be configured to cover only the main unit. In addition, it is possible to provide an auxiliary cover member that is continuous with the contour of the first cover member 40 and the second cover member 50 on the lid member side.

According to the present invention, in a reel unit of a spinning reel, the rear drag mechanism is mounted on the rear drag accommodating portion of the cover member so that the over all size of the reel unit will not increase and the reel unit can be formed with an inexpensive structure.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-168745. The entire disclosure of Japanese Patent Application No. 2003-168745 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A reel unit for a spinning reel, the spinning reel being adapted to be mounted to a fishing rod, provided with a rear drag mechanism, and capable of reeling out fishing line in a forward direction, comprising:
   a rod attachment leg portion that is adapted to be mounted on the fishing rod;
   a reel body that is continuously formed with the rod attachment leg portion and has a first opening formed on its rear end, the reel body having a mounting portion formed on a periphery of the first opening; and
   a cover member that is mounted on the mounting portion such that a contour of the cover member is smoothly continuous with a contour of the reel body, the cover member having a main body portion and a rear drag accommodating portion that projects rearward from the reel body and whose interior space communicates with the first opening, the rear drag mechanism being adapted to be mounted in the rear drag accommodating portion, the rear drag accommodating portion being unitarily formed with the main body portion.

2. The reel unit for a spinning reel disclosed in claim 1, wherein
   the cover member further includes a second opening formed in a rear end portion of the rear drag accommodating portion.

3. The reel unit for a spinning reel disclosed in claim 1, wherein
   the cover member is elastically engaged with the reel body by press-fitting.

4. The reel unit for a spinning reel disclosed in claim 1, wherein
   the cover member is fixedly coupled to the reel body with a screw.

5. The reel unit for a spinning reel disclosed in claim 1, wherein
the rear drag accommodating portion is formed in a cylindrical shape so as to project rearward from the main body portion.

6. The reel unit for a spinning reel disclosed in claim 5, wherein
the rear drag accommodating portion includes a male-threaded portion formed on its outer periphery, the male-threaded portion being adapted to engage with a female-threaded portion formed on an inner periphery of the rear drag mechanism.

7. A spinning reel that is adapted to be mounted on a fishing rod, comprising:
a handle;
a reel unit rotatively supporting the handle and including
a rod attachment leg portion that is adapted to be mounted on the fishing rod;
a reel body that is continuous with the rod attachment leg portion and has a first opening formed on its rear end, the reel body having a mounting portion formed on a periphery of the first opening; and
a cover member that is mounted on the mounting portion such that a contour of the cover member is smoothly continuous with a contour of the reel body, the cover member having a main body portion and a rear drag accommodating portion whose interior space communicates with the first opening, the rear drag accommodating portion being unitarily formed with the main body portion;
a rotor rotatively supported on a front of the reel unit;
a spool disposed on a front of the rotor so as to be movable forward and backward; and
a rear drag mechanism for applying drag force to the spool, the rear drag mechanism being mounted in the rear drag accommodating portion of the cover member.

8. The spinning reel disclosed in claim 7, wherein
the cover member further includes a second opening formed in a rear end portion of the rear drag accommodating portion.

9. The spinning reel disclosed in claim 7, wherein
the cover member is elastically engaged with the reel body by press-fitting.

10. The spinning reel disclosed in claim 7, wherein
the cover member is fixedly coupled to the reel body with a screw.

11. The spinning reel disclosed in claim 7, wherein
the rear drag accommodating portion is formed in a cylindrical shape so as to project rearward from the main body portion.

12. The spinning reel disclosed in claim 7, wherein
the rear drag mechanism includes a drag knobs on an inner periphery of which a female-threaded portion is formed, and
the rear drag accommodating portion is formed in a cylindrical shape and includes a male-threaded portion formed on its outer periphery, the male-threaded portion being adapted to engage with the female-threaded portion.

13. A cover member for a spinning reel adapted to be mounted to a reel body of the spinning reel, the reel body having a first opening on its rear end portion, the spinning reel being provided with a rear drag mechanism, the cover member comprising:
a main body portion that is adapted to be mounted to a mounting portion of the reel body; and
a rear drag accommodating portion that is unitarily formed with the main body portion and is adapted to project rearward from the reel body when the cover member is mounted to the reel body, the rear drag mechanism being adapted to be mounted in an interior space of the rear drag accommodating portion that communicates with the first opening when the cover member is mounted to the reel body.

14. The cover member disclosed in claim 13, wherein
the cover member further includes a second opening formed in a rear end portion of the rear drag accommodating portion.

15. The cover member disclosed in claim 13, wherein
the cover member is elastically engaged with the reel body by press-fitting.

16. The cover member disclosed in claim 13, wherein
the cover member is fixedly coupled to the reel body with a screw.

17. The cover member for a spinning reel disclosed claim 13, wherein
the rear drag accommodating portion is formed in a cylindrical shape so as to project rearward from the main body portion.

18. The cover member for a spinning reel disclosed in claim 17, wherein
the rear drag mechanism includes a drag knob1 on an inner periphery of which a female-threaded portion is formed, and
the rear drag accommodating portion includes a male-threaded portion formed on its outer periphery, the male-threaded portion being adapted to engage with the female-threaded portion.

* * * * *